United States Patent
Nakamura et al.

(10) Patent No.: US 8,405,266 B2
(45) Date of Patent: Mar. 26, 2013

(54) PRODUCTION METHOD OF VIBRATING MOTOR AND ROTOR FOR VIBRATING MOTOR

(75) Inventors: Manabu Nakamura, Miyota-machi (JP); Yuzuru Suzuki, Miyota-Machi (JP); Hiroyuki Furusaki, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 229 days.

(21) Appl. No.: 13/012,501

(22) Filed: Jan. 24, 2011

(65) Prior Publication Data

US 2011/0181133 A1 Jul. 28, 2011

(30) Foreign Application Priority Data

Jan. 25, 2010 (JP) .................. 2010-012945
Jul. 27, 2010 (JP) .................. 2010-167930

(51) Int. Cl.
*H02K 7/06* (2006.01)
(52) U.S. Cl. .......................... 310/81; 29/596
(58) Field of Classification Search ............ 310/81; 29/596
See application file for complete search history.

(56) References Cited

U.S. PATENT DOCUMENTS

| 7,626,295 | B2 * | 12/2009 | Yamaguchi | 310/81 |
| 2006/0250036 | A1 * | 11/2006 | Kayama et al. | 310/81 |

FOREIGN PATENT DOCUMENTS

| JP | 11-299148 A | | 10/1999 |
| JP | 2005-045932 | * | 2/2005 |
| JP | 2008-271719 A | | 11/2008 |

* cited by examiner

*Primary Examiner* — Nguyen N Hanh
(74) *Attorney, Agent, or Firm* — Oliff & Berridge, PLC (57) ABSTRACT

A vibrating motor has a shaft, a stator including a yoke having pole teeth extending toward an axis of the shaft from an inner circumference and coils wound around the pole teeth, a rotor including an eccentric weight formed on a radially outer surface of the shaft, and a permanent magnet integrally formed with the eccentric weight, and a bearing device rotatably supporting the rotor maintaining clearance between the inner circumference of the pole teeth and the rotor. The rotor has a structure in which the shaft, the eccentric weight, and the permanent magnet are integrally formed with each other by a thermoplastic magnetic material composing the permanent magnet.

13 Claims, 6 Drawing Sheets

PRODUCTION METHOD OF VIBRATING MOTOR AND ROTOR FOR VIBRATING MOTOR

RELATED APPLICATIONS

This application claims priority under 35 U.S.C. §119 to Japanese Patent Application Nos. 2010-012945 filed on Jan. 25, 2010 and 2010-167930 filed on Jul. 27, 2010, the entire contents of which are hereby incorporated by reference.

BACKGROUND OF THE INVENTION

1. Field of the Invention

The present invention relates to a production method for a vibrating motor and a rotor for a vibrating motor having a specific structure for fixing an eccentric weight.

2. Related Art

Some kinds of inner rotor type vibrating motors having a permanent magnet are used in products such as portable telephones. For example, Japanese patent application, First Publication No. 2008-271719 discloses a structure of a vibrating motor having a rotor composed of an axially eccentric weight and a permanent magnet. The vibrating motor includes a stator radially outwardly separated from the rotor for generating power for rotation and having a driving coil and a yoke.

Japanese patent application, First Publication No. 11-299148 discloses a production method for the rotor, including inserting an annular nonmagnetic material and a permanent magnetic material into a mold, injecting a resin such as a thermoplastic into the mold and integrally forming the resin, the annular nonmagnetic material, and the permanent magnet. A method in which a shaft is fixed to an eccentric weight by an adhesive is provided.

SUMMARY OF THE INVENTION

In the production method in which the rotor, including inserting an annular diamagnetic material and a permanent magnetic material into a mold, injecting resins such as thermoplastics into the mold and integrally forming the resins, the annular diamagnetic material and a permanent magnet, the number of parts is not easily reduced. In the method in which a shaft is fixed to an eccentric weight by adhesives, since a clearance for adhesives is necessary, accuracy such as coaxial accuracy of a rotor is limited. According to conventional production methods, a rotor for a vibrating motor requires many steps for production, and production costs for the rotor are not reduced. Therefore, an object of a present invention is to provide a rotor having high coaxial accuracy for a vibrating motor, which can be obtained by simplified processes.

The present invention provides a vibrating motor, including a yoke having pole teeth extending toward an axis thereof on an inner circumference, a stator having coils wound around the pole teeth, a shaft, an eccentric weight axially arranged, a rotor having a permanent magnet integrally formed with the eccentric weight, a bearing rotatably supporting the rotor with predetermined clearance in an axial inner surface of the pole teeth of the stator. In a vibrating motor the rotor has a structure in which the shaft, the eccentric weight and the permanent magnet are integrally formed by a thermoplastic magnetic material composing the permanent magnet.

According to a first aspect of the present invention, since the rotor of the vibrating motor is integrally formed of thermoplastic materials composing a permanent magnet, the rotor can be produced in fewer steps. The rotor has a structure in which the shaft, the eccentric weight and the permanent magnet are integrally formed, and therefore a rotor that can have high coaxial accuracy is provided for a vibrating motor.

According to a second aspect of the present invention, the rotor is formed by insertion molding of a thermoplastic material composing the permanent magnet in such a way that the shaft and the eccentric weight are disposed as insertion materials.

According to the second aspect of the present invention, the rotor has a structure in which the thermoplastic magnetic material is inserted into a mold (a die), in such a way the shaft and the eccentric weight are disposed as insertion materials therein, and therefore the rotor can have high coaxial accuracy and fewer steps for production.

According to a third aspect of the present invention, an outermost axial length excluding that of the shaft of the rotor is smaller than an outermost radial length of the rotor.

According to a fourth another aspect of the present invention, the eccentric weight is extended up to an outer surface of the permanent magnet.

According to a fifth aspect of the present invention, the concavity is formed in a peripheral portion of the shaft in the eccentric weight, and a part of the bearing is disposed in the concavity.

According to a sixth aspect of the present invention, a portion in which the shaft is connected to the eccentric weight is composed of the thermoplastic magnetic material composing the permanent magnet. According to this aspect, the shaft and the eccentric weight are not directly connected but are connected with the thermoplastic material as an insertion material.

According to a seventh aspect of the present invention, a connecting portion has a cylindrical shape and is connected to the shaft on an inner surface thereof, and a gap between the eccentric weight and the shaft is filled by the thermoplastic magnetic material composing the permanent magnet. According to this feature, error in positioning of the shaft and the eccentric weight and error in accuracy of dimensions of the eccentric weight are compensated by the thermoplastic magnetic material.

According to an eighth aspect of the present invention, a shape of the connecting portion when viewed from an axial direction is polygonal.

According to a ninth aspect of the present invention, the eccentric weight overlaps with the pole teeth when viewed from the axial direction.

According to a tenth aspect of the present invention, the eccentric weight overlaps with the coil when viewed from the axial direction.

According to an eleventh aspect of the present invention, a portion at which the eccentric weight overlaps the pole teeth when viewed from the axial direction is formed on both surfaces of the eccentric weight.

According to a twelfth aspect of the present invention, a portion at which the eccentric weight overlaps the coil when viewed from the axial direction, is formed on both surfaces of the eccentric weight The present invention provides a production method for a rotor for a vibrating motor in which a shaft, an eccentric weight, and a permanent magnet are integrally formed, the method including: disposing the shaft and the eccentric weight in a mold; and injecting the thermoplastic magnetic material composing a permanent magnet into the mold.

According to the first aspect of the present invention, the rotor is integrally formed by the thermoplastic magnetic material composing the permanent magnet, whereby the vibrating motor having high coaxial accuracy is obtained and the number of steps for production is reduced.

According to the second aspect of the present invention, the motor having a high accuracy in positioning between the shaft and the eccentric weight is provided.

According to the third aspect of the present invention, the vibrating motor that is axially thin and easily installed into a portable electronic device is provided.

According to the fourth aspect of the present invention, in the vibrating motor, radial mass unbalance of the rotor can be increased by increased radial mass of the outer portion, whereby high performance for vibration can be obtained.

According to the fifth aspect of the present invention, since the bearing of the shaft can be disposed in an axially inner portion of the eccentric weight, the vibrating motor can be thin According to the sixth aspect of the present invention, since an error in positioning between the shaft and the eccentric weight and an error in accuracy of size of the eccentric weight are compensated by the material composing the permanent magnet, the rotor can obtain high coaxial accuracy.

According to the seventh aspect of the present invention, since the error in positioning between the shaft and the eccentric weight and the error in accuracy of size of the eccentric weight are compensated by thickness of a cylindrical structure composing the permanent magnet, the shaft is accurately located.

According to the eighth aspect of the present invention, the shaft is strongly connected to the rotor since the shaft and the rotor are engaged each other.

According to the ninth aspect of the present invention, when viewed from an axial direction, since a radially outer portion of the eccentric weight is extended up to the position at which the radially outer portion of the eccentric weight overlaps with the pole teeth of the stator, radial mass unbalance of the eccentric weight is increased and a high performance for vibration can be obtained in a limited size.

According to the tenth aspect of the present invention, when viewed from the axial direction, since the radially outer portion of the eccentric weight is extended up to the position in which the radially outer portion of the eccentric weight overlaps with the coil of the stator, radial mass unbalance of the eccentric weight is increased and the high performance for vibration can be obtained in the limited size.

According to the eleventh and twelfth aspects of the present invention, when viewed from the axial direction, since both sides of the outer portion of the eccentric weight are extended up to the position at which both sides of the outer portion overlap with members of the stator, radial mass unbalance of the eccentric weight is effectively increased in the limited size.

According to a thirteenth aspect of the present invention, a vibrating motor is provided.

DETAILED DESCRIPTION OF THE PREFERRED EMBODIMENTS

Figure 1A:
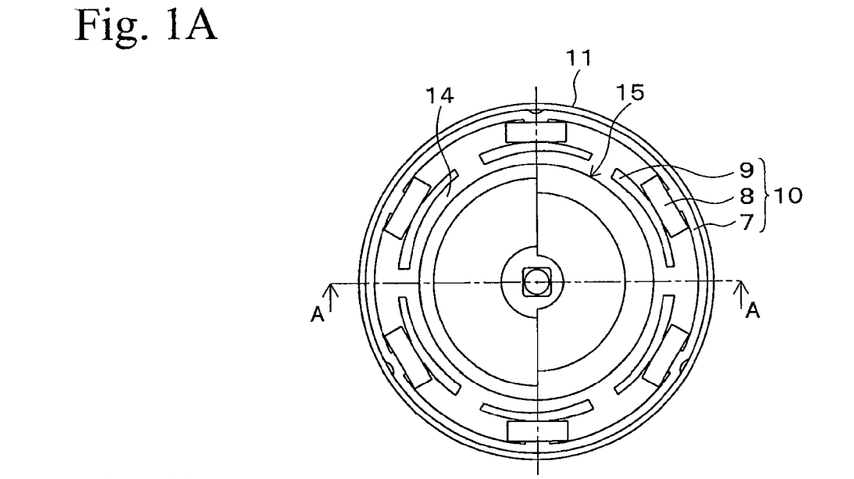
FIG. 1A is a plane view and FIG. 1B is a cross sectional view of a vibrating motor in accordance with a first embodiment of the present invention.
Figure 1B:
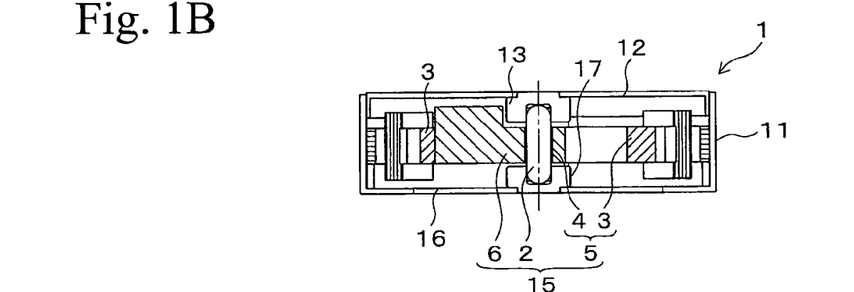

FIG. 1A is a plane view showing a first embodiment of the invention and FIG. 1B is a cross sectional view taken along line A-A in FIG. 1A. A vibrating motor 1 is shown in FIG. 1. The rotor 15 has a structure in which a stator 10 is provided on an inner surface of a case 11 as a package, and a rotor 15 is rotatably arranged with respect to the stator 10. Both axial sides of the vibrating motor 1 are closed by an upper cover 12 and a bottom cover 16. The upper cover 12 is fixed to the case 11 by an adhesive, and the bottom cover 16 is integrally formed with the case 11. FIG. 1A shows the vibrating motor 1 when viewed from an axial direction, in which the upper cover 12 and a bearing 13 are removed.

The stator 10 is explained as follows. The stator 10 is provided with a yoke 7, a coil 8, and pole teeth 9. The yoke 7 has the pole teeth 9 extending toward the axis thereof on an inner circumference and six coils 8 wound around the pole teeth 9. That is, the yoke 7 is a cylindrical member formed by a magnetic material. On the inner circumference of the yoke 7, six pole teeth 9 extending toward the axis are integrally formed with the yoke 7. Each of the pole teeth is wound around with the coil 8 acting as a driving coil. In this embodiment, each of the pole teeth 9 is arranged in an equal angle. Since the structure of wire bonding and a means for driving of the coil 8 are the same as in ordinary DC brushless motors, further explanation is omitted.

Figure 2A:
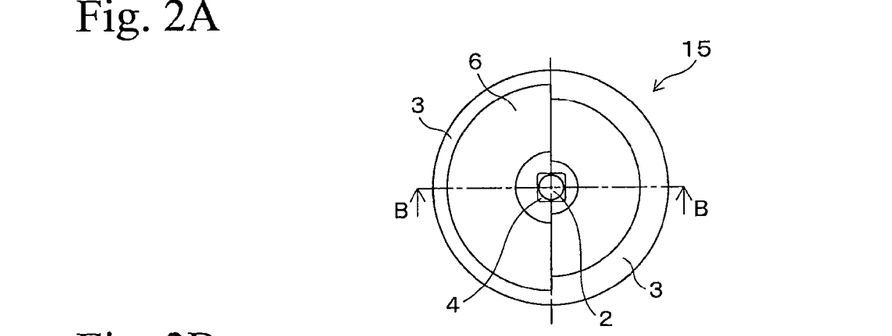
FIG. 2A is a plane view and FIG. 2B is a cross sectional view of a rotor in accordance with the first embodiment.
Figure 2B:
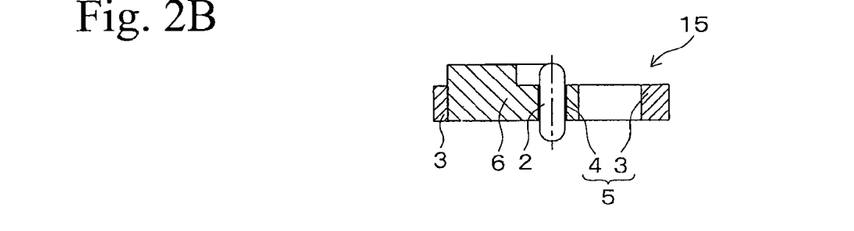
Figure 3A:
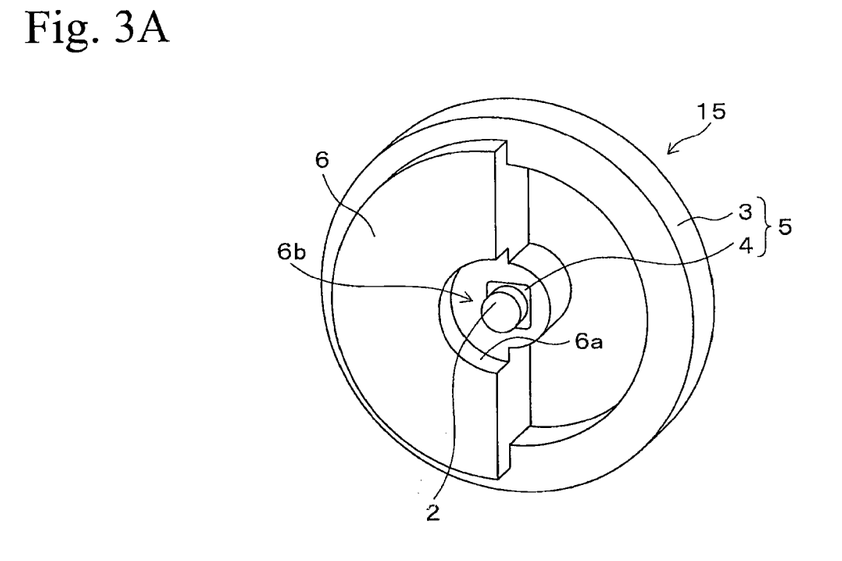
FIG. 3A is a perspective view and FIG. 3B is an exploded perspective view of the rotor in accordance with the first embodiment.
Figure 3B:
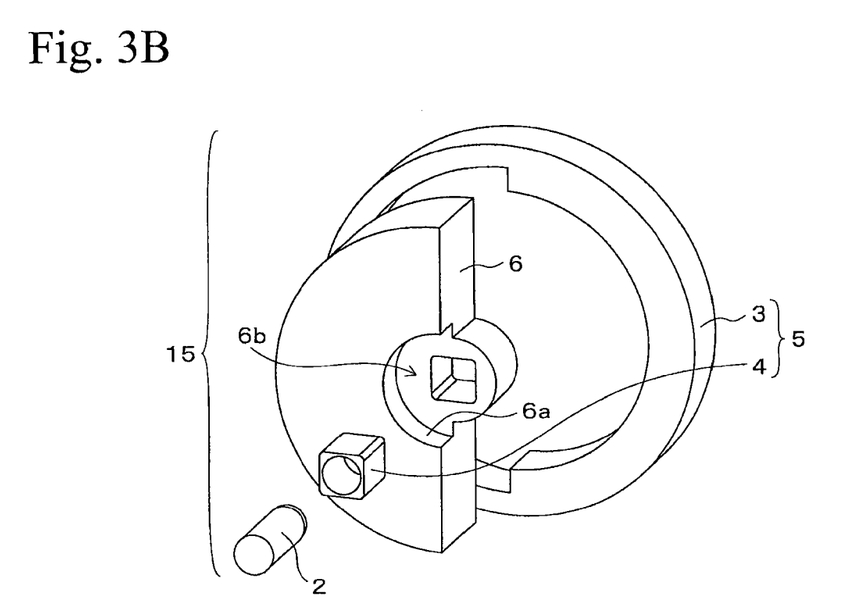

The rotor 15 is explained as follows. The rotor 15 is shown in FIGS. 2 and 3. The rotor 15 is arranged in a position that is separated from heads of the pole teeth 9 of the stator 10 with a clearance 14 as a magnetic gap (see FIG. 1). The rotor 15 is provided with a shaft 2, a permanent magnet 3, a sleeve 4, and an eccentric weight 6. The shaft 2 is an axis for rotation of the vibrating motor 1 and is rotatably supported by the bearing 13 and a bearing 17 with respect to the upper cover 12 and the bottom cover 16. The shaft 2, for example, may be composed of stainless steel. The permanent magnet 3 functions as a magnet for the rotor 15 and is magnetized in multiple poles. Since the structure of magnetizing is the same as in ordinary DC brushless motors, further explanation of the structure is omitted. The material of the permanent magnet may be composed of a thermoplastic magnetic material such as neodymium type materials.

The eccentric weight 6 is used to generate vibration in rotating, and the eccentric weight 6 has a shape to obtain eccentric mass balance with respect to the axis for the shaft 2. In this embodiment, the shape of the eccentric weight 6 viewed from the axial direction is substantially a semicircle. The eccentric weight 6 is not only radially larger (longer) than the inner diameter of the permanent magnet 3, but also axially larger (longer) than the permanent magnet 3. As the material of the eccentric weight 6, for example, tungsten having heavy specific gravity is used. The shape of the eccentric weight 6 when viewed from an axial direction is not restricted to the shape shown in FIG. 3 if eccentric mass balance is ensured.

The sleeve 4 is a cylindrical member made from the same material as the permanent magnet 3 and is simultaneously formed in molding the permanent magnet 3. The shaft 2 is connected to the eccentric weight 6 via the sleeve 4. The sleeve 4 functions as a member to locate the position of the shaft 2, (in other words, a member for centering), as described later. In this embodiment, the outer shape of the sleeve 4 is square when viewed from an axial direction. Therefore, the structures of the sleeve 4 and the eccentric weight 6 are engaged with each other, and the sleeve 4 and the eccentric weight 6 are strongly connected. The outer shape of sleeve 4 when viewed from the axial direction is not restricted to a square, and it may be a polygon such as a hexagon, a star shape, or it may be an ellipse.

The outermost axial length of the rotor 15 (excluding the axial length of the shaft 2) is smaller than the outermost radial length of the rotor 15. That is, the rotor 15 has a flat structure in which the axial length is shorter than the radial length, whereby the structure has an advantage when installed in flat electronic devices such as portable telephones.

As shown in FIG. 3, a step portion 6a is radially formed, and a concavity 6b that is partially thinned is formed in a peripheral portion of the shaft 2 of the eccentric weight 6. As shown in FIG. 1B, a part of the bearing 13 is disposed in a portion of the step portion 6a. For this structure, the axial length of the vibrating motor 1 is reduced, and the vibrating motor 1 can be thin.

A production process for the rotor 15 is explained as follows. First, the shaft 2, the eccentric weight 6, and a mold (a die), not shown, are prepared. The mold is used to form the permanent magnet 3 and the sleeve 4 from the thermoplastic magnetic material, in such a way the shaft 2 and the eccentric weight 6 are disposed as insertion materials therein.

The eccentric weight 6 and the mold are prepared in advance, and the shaft 2 and the eccentric weight 6 are disposed at predetermined locations. Then, the thermoplastic magnetic material is injected into the mold and an insertion molding is performed by injection. In this process, the sleeve 4 and the permanent magnet 3 are synchronously formed as a molded magnet 5, and the shaft 2 is integrally formed with the eccentric weight 6 by the thermoplastic magnetic material composing the molded magnet 5 as a bonding material. That is, a molding in which the shaft 2, the sleeve 4, the permanent magnet 3 and the eccentric weight 4 are integrally formed is obtained. Then, the molding is removed from the mold, thereby obtaining an original form of the rotor 15. Then the permanent magnet 3 is subjected to magnetizing. Thus, the rotor 15 is completed.

In the rotor 15 produced in the above process, the shaft 2, the eccentric weight 6, and the permanent magnet 3 are integrally formed by the thermoplastic magnetic material composing the permanent magnet 3. That is, the rotor 15 is formed in the insertion molding by the thermoplastic magnetic material composing the permanent magnet 3 in such a way that the shaft 2 and the eccentric weight 6 are disposed as insertion materials.

According to the embodiment, the rotor 15 in which the shaft 2, the eccentric weight 6, and the permanent magnet 3 are integrally formed by the thermoplastic magnetic material composing the permanent magnet 3 is provided. The sleeve 4 is formed by the thermoplastic magnetic material composing the permanent magnet 3, and the shaft 2 is integrally formed with the eccentric weight 6. Therefore, the vibrating motor can have high coaxial accuracy and be produced in fewer steps.

That is, the rotor 15 is integrally formed with the permanent magnet 3 by the thermoplastic magnetic material as a bonding material, in such a way that the shaft 2 and the eccentric weight 6 are disposed as insertion materials in the mold (not shown). In this embodiment, the shaft 2 is integrally formed with the eccentric weight 6 by the thermoplastic magnetic material as the bonding material, and the permanent magnet 3 is integrally formed. Therefore, the rotor 15 can be integrally formed without another molding material (such as resins or adhesives for integral molding).

Moreover, in the embodiment, the shaft 2 is located in the rotor 15 according to the position of the shaft 2 in the mold in spite of an error in positioning between the shaft 2 and the eccentric weight 6 and an error in accuracy of dimensions of the eccentric weight 6. That is, the sleeve 4 is integrally formed with the permanent magnet 3 by the thermoplastic magnetic material injected into the mold and a gap between the eccentric weight 6 and the shaft 2 is filled up therewith. Therefore, the error in positioning between the shaft 2 and the eccentric weight 6 and the error in accuracy of dimensions of the eccentric weight 6 are compensated by the thickness of the sleeve 4.

In other words, even if the position of the eccentric weight 6 in the mold is not accurate and dimensions of the eccentric weight 6 is not accurate, the position of the shaft 2 can be accurately located (that is, centering of the shaft 2 is performed), since the errors are compensated by the thickness of the sleeve 4 and the radial thickness of the permanent magnet 3 as long as the sleeve 4 is not prevented from being formed by the errors and the positioning of the shaft 2 is not affected thereby. This means that the sleeve 4 functions as a member to locate the position of the shaft 2 (a member for centering). According to the embodiment, the position of the shaft 2 is accurately located and high coaxial accuracy can be obtained even in the simplified process. The error in positioning between the shaft 2 and the eccentric weight 6 described in this embodiment means unevenness of mutual relationship in positioning between the shaft 2 and the eccentric weight 6, and the error in accuracy of dimensions of the eccentric weight 6 means unevenness in dimensions of the eccentric weight 6. The errors in dimensional accuracy are caused by working precision and a nonuniformity in materials of the eccentric weight 6.

Moreover, according to this embodiment, resins and adhesives are unnecessary in this process compared to conventional processes in which resins or adhesives are used, and surplus clearances for intervention of reins or adhesives are unnecessary. Therefore material cost and labor in the producing process can be reduced. This is because surplus clearance is not required, degradation in dimensional accuracy caused by the clearance is avoidable, and high coaxial accuracy can be obtained.

Second to fifth embodiments according to the invention will be explained as follows.

Figure 4A:
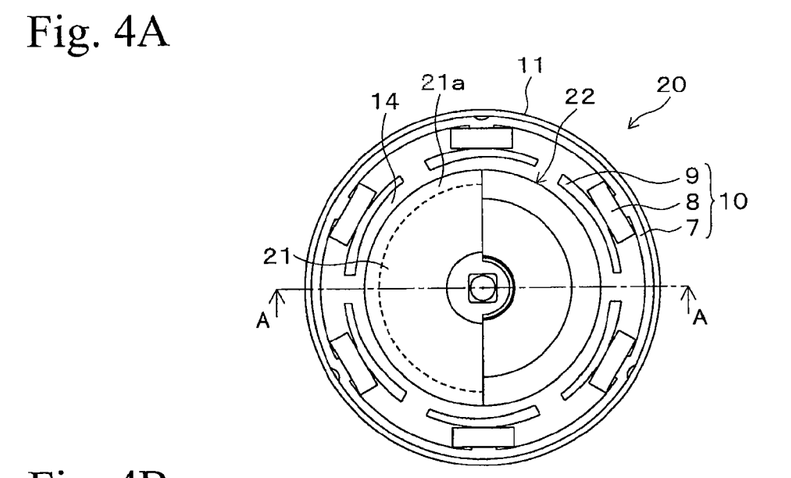
FIG. 4A is a plane view and FIG. 4B is a cross sectional view of a vibrating motor in accordance with a second embodiment.
Figure 4B:
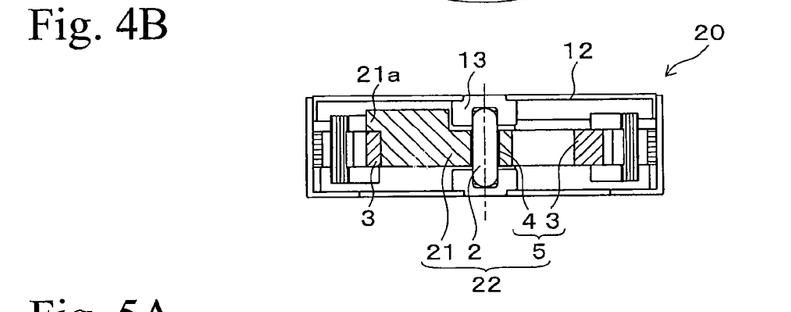

FIG. 4A is a plane view and FIG. 4B is a cross sectional view of a vibrating motor 20 in accordance with a second embodiment, each of FIGS. 4A and 4B is viewed from the same direction as FIGS. 1A and 1B. The shape of an eccentric weight 21 of a rotor 22 is different from that of the vibrating motor 1 in FIGS. 1A and 1B. In the vibrating motor 20, an extensional portion 21a is provided, in which the outer surface of the eccentric weight 21 is extended up to the outer surface of the permanent magnet 3 for more effective vibration. The shape of the extensional portion 21a partially overlaps with the permanent magnet 3 when viewed from an axial direction. According to the structure of the embodiment, a mass of the extensional portion 21a is added to an outer surface of the rotor 22, whereby mass unbalance to the shaft 2 is increased and more effective vibration is obtained.

Figure 5A:
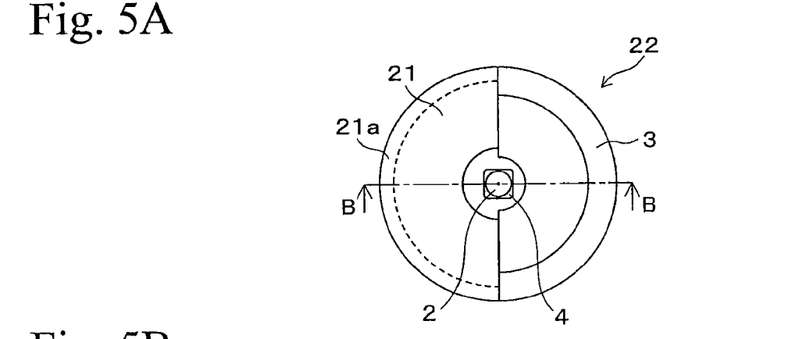
FIG. 5A is a plane view and FIG. 5B is a cross sectional view of a rotor in accordance with the second embodiment.
Figure 5B:
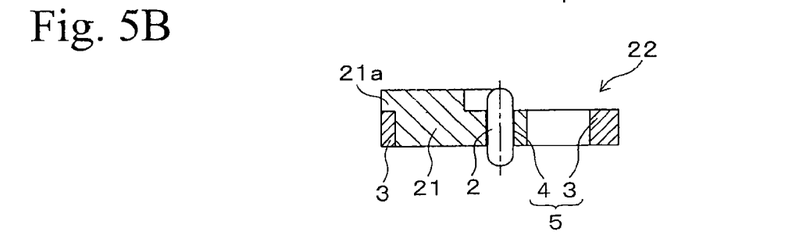

FIG. 5A is a plane view of the rotor 22 and FIG. 5B is a cross sectional view of the rotor 22 taken along line B-B in FIG. 4A. As shown in FIGS. 5A and 5B, the eccentric weight 21 is extended up to a radially peripheral portion of the permanent magnet 3, whereby mass of an outer portion of the rotor 22 is increased and more effective vibration is obtained.

According to a second embodiment, since the permanent magnet 3 is formed by molding with the thermoplastic magnetic material which is injected into the mold, the eccentric weight 21 having a shape such one as shown in FIGS. 4A and 4B can be used with less labor and difficulty in the production process. That is, the shape of the eccentric weight 21 may be more freely chosen. Therefore the eccentric weight 21 can be reduced in size and easily yield necessary performance of vibration. Complicated shapes may be applied in assembling parts. These advantages are obtained in structures of the following embodiments.

Figure 6A:
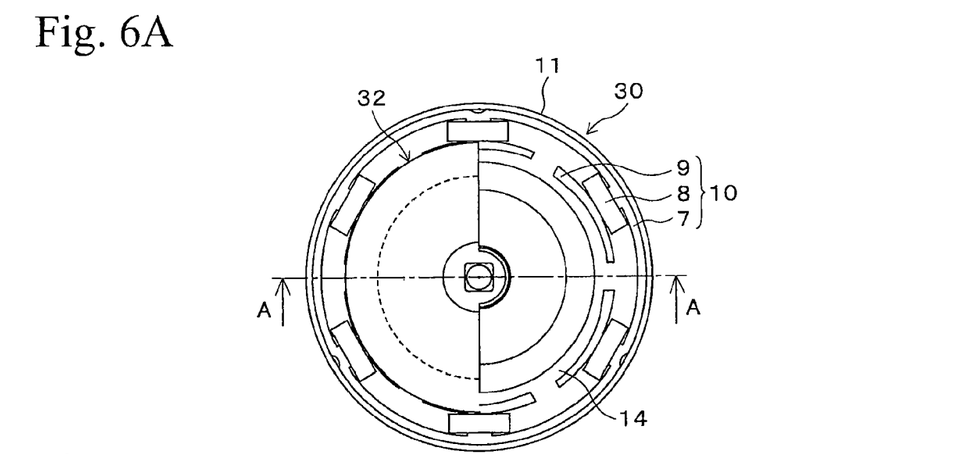
FIG. 6A is a plane view and FIG. 6B is a cross sectional view of a vibrating motor in accordance with a third embodiment.
Figure 6B:
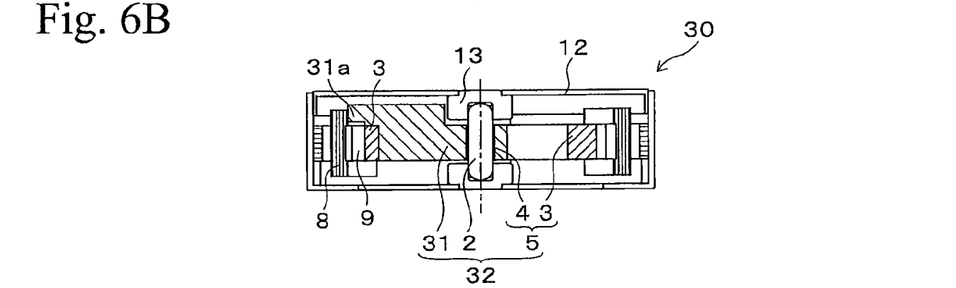
Figure 7A:
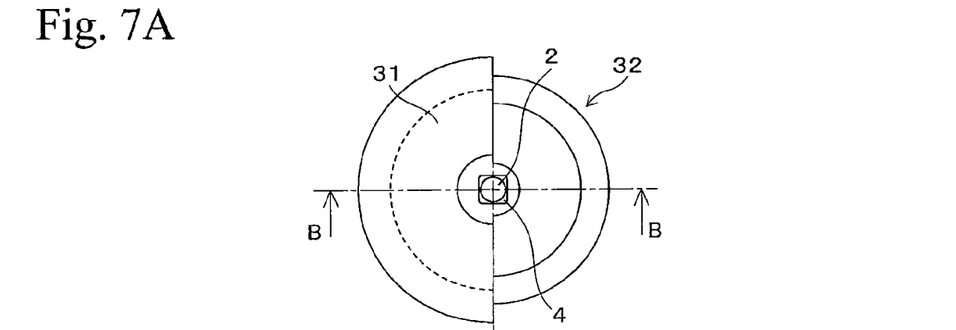
FIG. 7A is a plane view and FIG. 7B is a cross sectional view of a rotor in accordance with the third embodiment.
Figure 7B:
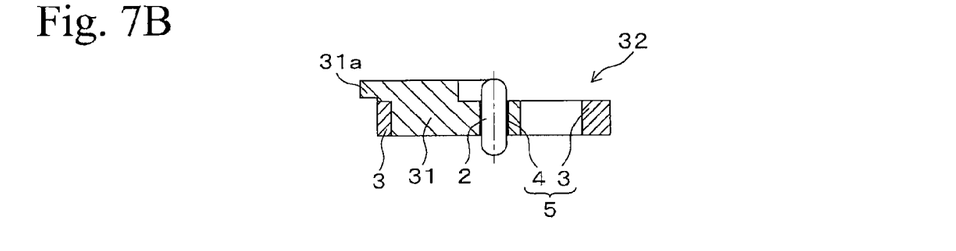

According to a third embodiment, FIG. 6A is a plane view and FIG. 6B is a cross sectional view of a vibrating motor 30, each of FIGS. 6A and 6B is viewed from the same direction as FIGS. 1A and 1B. FIG. 7A is a plane view of a rotor 32 in FIG. 6A, and FIG. 7B is a cross sectional view of the rotor 32 taken along line B-B in FIG. 7A. The vibrating motor 30 is shown in FIGS. 6A and 6B. In the vibrating motor 30, an extensional portion 31a is provided, and in order to obtain effective vibration, one side of an outer surface of the eccentric weight 31 is radially extended up to the position overlapping with the pole teeth 9 when viewed from an axial direction. The extensional portion 31a does not contact the members in the stator 10. Portions other than the eccentric weight 31 in the vibrating motor 30 are the same as the portions of the vibrating motor 1 shown in FIG. 1A. According to the structure, the mass of the extensional portion 31a is added at an outer side of the rotor 32, whereby mass unbalance to the shaft 2 is increased and more effective vibration is obtained.

Figure 8A:
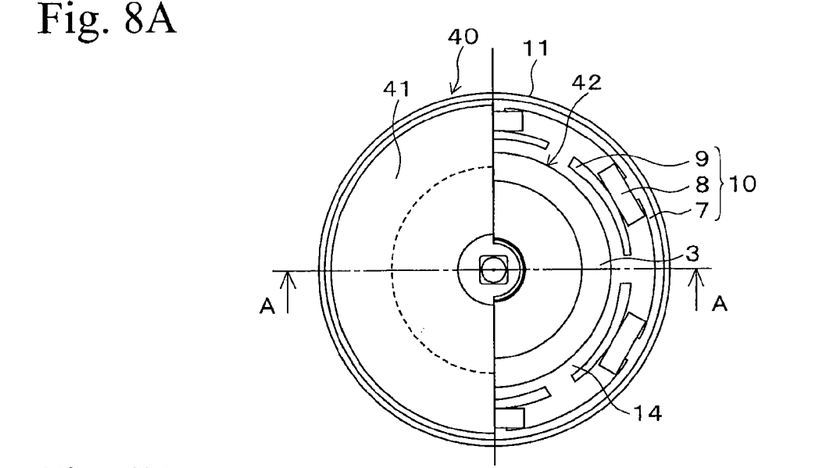
FIG. 8A is a plane view and FIG. 8B is a cross sectional view of a vibrating motor in accordance with a fourth embodiment.
Figure 8B:
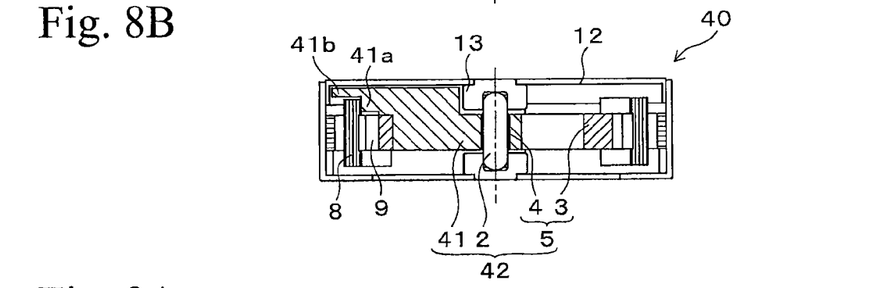
Figure 9A:
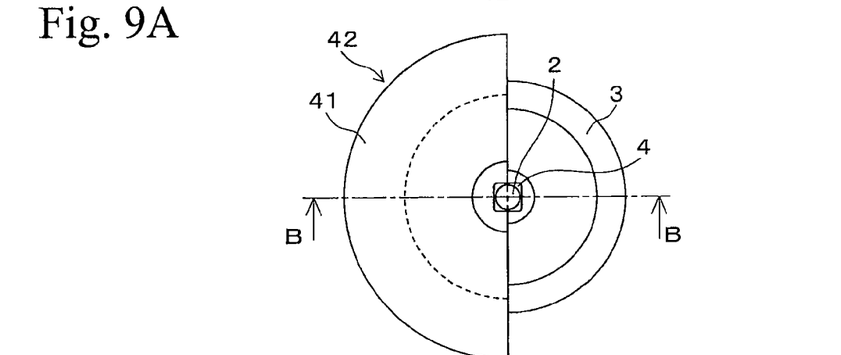
FIG. 9A is a plane view and FIG. 9B is a cross sectional view of a rotor in accordance with the fourth embodiment.
Figure 9B:
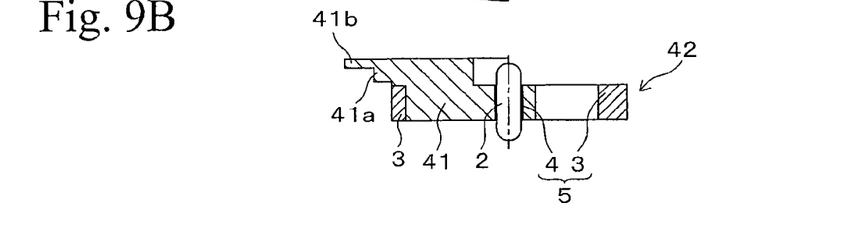

According to a fourth embodiment, FIG. 8A is a plane view and FIG. 8B is a cross sectional view of a vibrating motor 40, each FIGS. 8A and 8B is viewed from the same direction as FIGS. 1A and 1B. FIG. 9A is a plane view of a rotor 42 in FIG. 8A, and FIG. 9B is a cross sectional view of the rotor 42 taken along line B-B in FIG. 9A. The vibrating motor 40 is shown in FIG. 8A. In vibrating motor 40, an eccentric weight 41 is more extended in an outer direction than the eccentric weight 31 in FIGS. 6A and 6B of the third embodiment. That is, in the vibrating motor 40, in order to obtain more effective vibration than the vibrating motor 30, one side of an outer surface of the eccentric weight 41 is radially extended beyond the pole teeth 9 to the position overlapping with the coil 8 in the stator 10. In this embodiment, an extensional portion 41a is provided in a portion in which the eccentric weight 41 overlaps with the pole teeth 9 and an external portion 41b radially extending from the extensional portion 41a is provided in a portion in which the eccentric weight 41 overlaps with the coil 8. The external portion 41a corresponds to the external portion 31a in FIGS. 6A, 6B, FIGS. 7A and 7B. In this embodiment, the external portions 41a and 41b do not contact the members in the stator 10. The structure of other portions of the vibrating motor 40 are the same as that of the vibrating motor 1 shown in FIG. 1A and the rotor 30 in FIGS. 6A and 6B. According to the structure, the mass of the extensional portion 42a and 41b is added at an outer side of the rotor 42, whereby mass imbalance at a shaft 2 is increased.

Figure 10A:
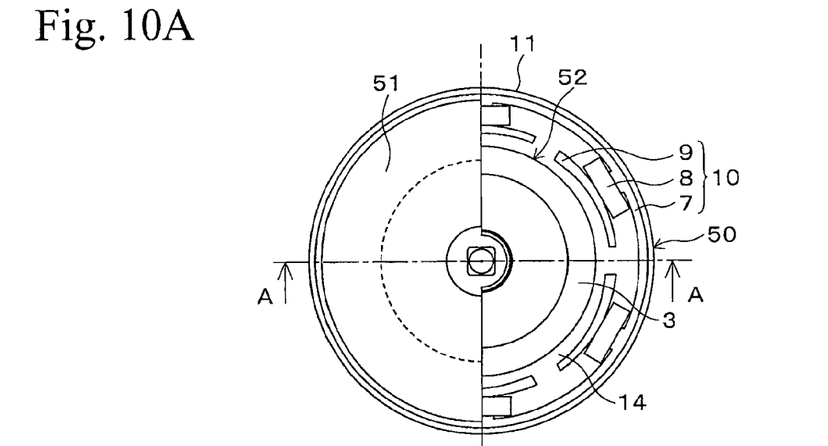
FIG. 10A is a plane view and FIG. 10B is a cross sectional view of a vibrating motor in accordance with a fifth embodiment.
Figure 10B:
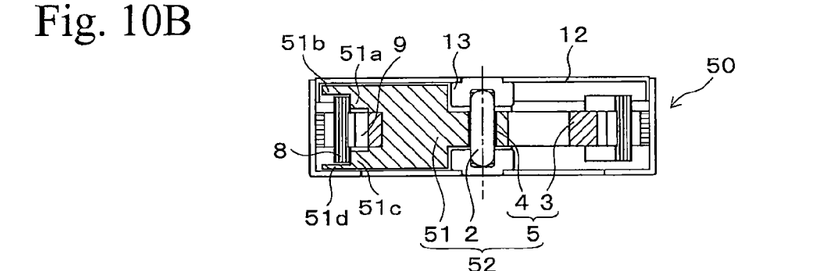
Figure 11A:
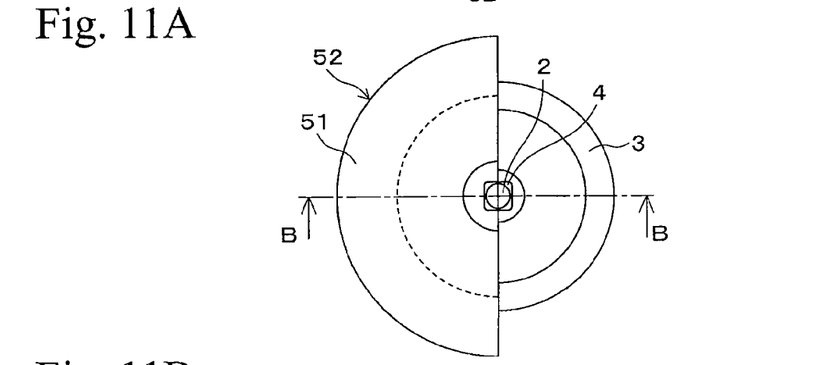
FIG. 11A is a plane view and FIG. 11B is a cross sectional view of a rotor in accordance with the fifth embodiment.
Figure 11B:
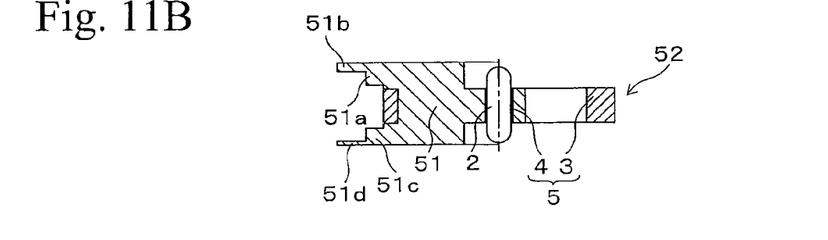

According to a fifth embodiment, FIG. 10A is a plane view and FIG. 10B is a cross sectional view of a vibrating motor 40, and each of FIGS. 10A and 10B is viewed from the same direction as FIGS. 1A and 1B. FIG. 11A is a plane view of a rotor 52 in FIG. 10A, and FIG. 11B is a cross sectional view of the rotor 42 taken along line B-B in FIG. 11A. A vibrating motor 50 is shown in FIGS. 10A and 10B. In the vibrating motor 50, both axial sides of the outer surface of an eccentric weight 51 are radially extended up to the same position in the vibrating motor 40 shown in FIGS. 8A and 8B. That is, in the vibrating motor 50, an eccentric weight 51 is provided such that both upper and lower axial sides thereof are radially extended as shown in FIG. 10B. An external portion 51a and an external portion 51b are provided at an upper side of the extended portion of the eccentric weight 51, an external portion 51c and an external portion 51d are provided at a lower side of the extended portion. The external portions 51a and 51c radially overlap with the pole teeth 9 when viewed from an axial direction, and the external portions 51b and 51d radially overlap with the coil 8. According to the embodiment, mass imbalance to the shaft 2 can be further increased and more effective vibration can be obtained in a limited size compared to the vibrating motor 40 in FIGS. 8A and 8B.

It should be noted that, in the rotor 50, the external portions 51b and 51d may be omitted in the structure, but the external portions 51a and 51c are provided. This structure corresponds to a structure in which the external portions 31 radially overlapping with the pole teeth 9 when viewed from an axial direction, is provided not only on the upper side of the surface, but on the lower side of the surface of the eccentric weight 3 of the vibrating motor 30 in FIGS. 6A, 6B, 7A and 7B.

The present invention is not limited to the above embodiments and includes variations obvious to those skilled in art, and effects of the invention are not restricted by the above embodiments. That is, various additions, modifications, and partial omissions are possible within the scope of the concept and the objects of the invention, as claimed and equivalents thereof.

The present invention can be used for vibrating motors.

What is claimed is:
1. A vibrating motor comprising:
a shaft,
a stator including a yoke having pole teeth extending toward an axis of the shaft from an inner circumference and coils wound around the pole teeth;
a rotor including an eccentric weight formed on a radially outer surface of the shaft, and a permanent magnet integrally formed with the eccentric weight;
a bearing device rotatably supporting the rotor maintaining clearance between the inner circumference of the pole teeth and the rotor;
wherein the rotor has a structure in which the shaft, the eccentric weight and the permanent magnet are integrally formed with each other by a thermoplastic magnetic material composing the permanent magnet.

2. The vi rating motor according to claim 1, wherein the rotor is formed by insertion molding of the thermoplastic magnetic material composing the permanent magnet, and the shaft and the eccentric weight are used as materials for the insertion.

3. The vibrating motor according to claim 1, wherein an outermost axial length of the rotor, excluding an axial length of the shaft, is smaller than an outermost radial length of the rotor.

4. The vibrating motor according to claim 1, wherein the eccentric weight extends as far as a radially outer surface of the permanent magnet.

5. The vibrating motor according to claim 1, wherein a concavity is formed at a peripheral portion of the shaft in the eccentric weight, and a part of the bearing is disposed in the concavity.

6. The vibrating motor according to claim 1, wherein the shaft is connected to the eccentric weight by a connecting portion, and the connecting portion is formed by the thermoplastic magnetic material composing the permanent magnet.

7. The vibrating motor according to claim 6, wherein the connecting portion has a tubular structure, the shaft contacts an inner surface of the tubular structure, and the eccentric weight contacts an outer surface of the tubular structure.

8. The vibrating motor according to claim 7, wherein the connecting portion has a polygonal shape when viewed from an axial direction.

9. The vibrating motor according to claim 1, wherein the eccentric weight overlaps with the pole teeth when viewed from an axial direction.

10. The vibrating motor according to claim 9, wherein a portion of the eccentric weight overlapping with the pole teeth, when viewed from an axial direction, is formed on both sides of the eccentric weight, when viewed from a direction perpendicular to the axial direction.

11. The vibrating motor according to claim 1, wherein the eccentric weight overlaps with the coils when viewed from an axial direction.

12. The vibrating motor according to claim 11, wherein a portion of the eccentric weight overlapping with the coils, when viewed from an axial direction, is formed on both sides of the eccentric weight, when viewed from a direction perpendicular to the axial direction.

13. A production method for a rotor for a vibrating motor comprising:
    preparing a shaft, an eccentric weight and a mold;
    disposing the shaft and the eccentric weight in the mold; and
    integrally forming the shaft, the eccentric weight and a permanent magnet by injecting a thermoplastic magnetic material into the mold.

* * * * *